US008677854B2

(12) United States Patent
Lundberg

(10) Patent No.: US 8,677,854 B2
(45) Date of Patent: Mar. 25, 2014

(54) APPARATUS FOR A ROBOT ARM

(75) Inventor: Ivan Lundberg, Västerås (SE)

(73) Assignee: ABB Researched Ltd., Zürich (CH)

( * ) Notice: Subject to any disclaimer, the term of this patent is extended or adjusted under 35 U.S.C. 154(b) by 228 days.

(21) Appl. No.: 13/259,509

(22) PCT Filed: Apr. 15, 2009

(86) PCT No.: PCT/EP2009/054430
§ 371 (c)(1),
(2), (4) Date: Sep. 23, 2011

(87) PCT Pub. No.: WO2010/118769
PCT Pub. Date: Oct. 21, 2010

(65) Prior Publication Data
US 2012/0011956 A1    Jan. 19, 2012

(51) Int. Cl.
*B25J 18/00*    (2006.01)
*B25J 17/00*    (2006.01)

(52) U.S. Cl.
USPC .................................. 74/490.01; 74/490.03

(58) Field of Classification Search
USPC ............... 74/490.01, 490.02, 490.03, 490.04, 74/490.05, 490.06; 901/27, 28, 29
See application file for complete search history.

(56) References Cited

U.S. PATENT DOCUMENTS 4,527,945 A    7/1985  Passemard et al.
4,589,816 A *  5/1986  Eberle et al. ................... 414/680

(Continued)

FOREIGN PATENT DOCUMENTS

EP    0233712 A2    8/1987
EP    0612591       8/1994

(Continued)

OTHER PUBLICATIONS

PCT/ISA/210—International Search Report—Nov. 3, 2009.

(Continued)

*Primary Examiner* — Ha D Ho
*Assistant Examiner* — Jude Agendia
(74) *Attorney, Agent, or Firm* — Venable LLP; Eric J. Franklin

(57) ABSTRACT

An apparatus for a robot arm of an industrial robot. A first module includes a first and a second member rotatable in relation to each other about a first axis of rotation. A second module includes a first and a second member rotatable in relation to each other about a second axis of rotation. The first member of the second module is attached to the second member of the first module. A third module includes a first and a second member rotatable in relation to each other about a third axis of rotation. The first member of the third module is attached to the second member of the second module. The second axis of rotation is substantially perpendicular to the first and the third axis of rotation. The second axis of rotation is offset from the first and the third axis of rotation when the first axis of rotation is substantially parallel to the third axis of rotation. The third module includes a motor unit including an output shaft rotatable about an axis which is substantially collinear with the third axis of rotation. The motor unit intersects a plane in which the second axis of rotation lies. The plane is substantially perpendicular to the third axis of rotation.

16 Claims, 4 Drawing Sheets

(56) References Cited

U.S. PATENT DOCUMENTS

| | | | |
|---|---|---|---|
| 4,766,775 | A | 8/1988 | Hodge |
| 4,900,997 | A | 2/1990 | Durand et al. |
| 4,969,795 | A * | 11/1990 | Toyoda et al. ............. 414/744.2 |
| 5,357,824 | A * | 10/1994 | Hashimoto ................. 74/490.03 |
| 5,497,674 | A * | 3/1996 | Inada ......................... 74/490.03 |
| 6,014,909 | A * | 1/2000 | Fiora .......................... 74/490.02 |
| 6,250,174 | B1 * | 6/2001 | Terada et al. .............. 74/490.02 |
| 7,513,174 | B2 * | 4/2009 | Harada et al. .............. 74/490.06 |
| 7,631,573 | B2 * | 12/2009 | Kidooka et al. ............ 74/490.02 |
| 7,971,504 | B2 * | 7/2011 | Haniya et al. .............. 74/490.03 |
| 8,109,170 | B2 * | 2/2012 | Jinushi et al. .............. 74/490.01 |
| 8,266,979 | B2 * | 9/2012 | Yonehara et al. .......... 74/490.03 |
| 8,434,387 | B2 * | 5/2013 | Nakagiri et al. ............ 74/665 R |
| 2006/0150852 | A1 * | 7/2006 | Loddenkoetter .............. 101/485 |

FOREIGN PATENT DOCUMENTS

| | | |
|---|---|---|
| EP | 1930129 | 6/2008 |
| JP | 02298482 A | 12/1990 |
| WO | WO-2005/061189 A1 | 7/2005 |
| WO | WO-2007/099511 A2 | 9/2007 |

OTHER PUBLICATIONS

PCT/ISA/237—Written Opinion of the International Searching Authority—Nov. 3, 2009.

Notification Concerning Transmittal of International Preliminary Report on Patentability (Chapter I of the Patent Cooperation Treaty; International Preliminary Report on Patentability; and Written Opinion of the International Searching Authority, Oct. 27, 2011, in connection with counterpart application PCT/EP2009/05443.

* cited by examiner

APPARATUS FOR A ROBOT ARM

CROSS-REFERENCE TO RELATED APPLICATIONS

This application is the national phase under 35 U.S.C. §371 of PCT/EP2009/054430 filed 15 Apr. 2009.

TECHNICAL FIELD

The present invention relates to an apparatus for a robot arm, or a manipulator arm, of an industrial robot, which apparatus comprises a first module comprising a first and a second member rotatable in relation to each other about a first axis of rotation, the first member being indirectly, or directly, connectable to a base of the industrial robot; a second module comprising a first and a second member rotatable in relation to each other about a second axis of rotation, the first member of the second module being rigidly attached to the second member of the first module; and a third module comprising a first and a second member rotatable in relation to each other about a third axis of rotation, the first member of the third module being rigidly attached to the second member of the second module. The second axis of rotation is substantially perpendicular to the first and the third axis of rotation, the second axis of rotation is offset from the first and the third axis of rotation when the first axis of rotation is substantially parallel to the third axis of rotation, and the third module comprises a motor unit comprising an output shaft rotatable about an axis which is substantially collinear with the third axis of rotation, the motor unit being adapted to drive the relative rotation of the first and second members of the third module.

BACKGROUND OF THE INVENTION

Industrial robots, or modular robots, are conventionally designed according to a specific design scheme for how joint actuators, such as electric motor units, and structural elements, such as joint modules, are connected to form a robot arm, or a manipulator. There are various kinds of known modular robot designs and various designs of joints and arm modules in prior art.

EP-A1-1 930 129 describes an articulated manipulator comprising a plurality of arm bodies in series, and joint parts rotatably connecting two adjacent arm bodies of the plurality of arm bodies, where the joint parts are provided such that rotation axes of the adjacent joint parts intersect each other at right angles.

U.S. Pat. No. 4,527,945 discloses a swivelling handle for a robot arm including three reduction gear assemblies, each assuring the control of movement about three axes of rotation, where one of the axes intersects both of the other two.

WO-A1-2005/061189 describes a wrist unit for connection to a robot arm of an industrial robot. U.S. Pat. No. 4,766,775 discloses a modular robotic manipulator comprising articulating modules. U.S. Pat. No. 4,900,997 describes a device to guide an object around two axes of rotation. EP-A1-0 612 591 discloses a motorized rotary joint for robots.

WO-A2-2007/099511 discloses a programmable robot system comprising a robot provided with a number of individual arm sections, where adjacent sections are interconnected by a joint.

EP-A2-0 233 712 discloses an industrial robot having integrated joint drive modules assembled in series to form an arm. The joint modules are of two basic types, roll joints and pitch joints, and the typical robot arm configuration includes a series of alternating pitch joints and roll joints terminating in a tool at the distal end of the arm. Each joint, or joint module, is independently powered by its own motor which is attached to the joint. Each pitch joint is disposed with its axis of rotation substantially perpendicular to the roll joint axes, and each pitch joint is offset from the longitudinal axis of the robot arm extended with the roll joint axes collinear. Said offset permits the robot arm to be folded back on itself or to be fully extended.

However, the above-mentioned industrial robot designs have various kinds of drawbacks. Some designs result in a bulky arm structure, in one or more directions, which is not as compact as desired. Some designs have limitations in the dynamic performance, e.g. because of high inertia caused by the weight the arm modules or joints of the arm, and have limited joint strokes. This impairs or limits the movement of the robot arm.

THE OBJECT OF THE INVENTION

The object of the present invention is thus to improve the movement and the dynamic performance of a robot arm.

SUMMARY OF THE INVENTION

The above-mentioned object of the present invention is attained by providing an apparatus for a robot arm of an industrial robot, which apparatus comprises a first module comprising a first and a second member rotatable in relation to each other about a first axis of rotation, the first member being indirectly, or directly, connectable to a base of the industrial robot, a second module comprising a first and a second member rotatable in relation to each other about a second axis of rotation, the first member of the second module being rigidly attached to the second member of the first module, and a third module comprising a first and a second member rotatable in relation to each other about a third axis of rotation, the first member of the third module being rigidly attached to the second member of the second module, where the second axis of rotation is substantially perpendicular to the first and the third axis of rotation, the second axis of rotation is offset from the first and the third axis of rotation when the first axis of rotation is substantially parallel to the third axis of rotation, and the third module comprises a motor unit comprising an output shaft rotatable about an axis which is substantially collinear with the third axis of rotation, the motor unit being adapted to drive the relative rotation of the first and second members of the third module, and the motor unit intersects a plane in which the second axis of rotation lies, which plane is substantially perpendicular to the third axis of rotation.

The first module can be categorized as a roll joint module, the second module can be categorized as a pitch joint module, and the third module can be categorized as a roll joint module. By the apparatus of the present invention, the motor unit of the third module is displaced in such a way that the centre of gravity of the third module is displaced in an advantageous way in the direction towards the first module and closer to the second module and the second axis of rotation. By the inventive displacement of the centre of gravity of the third module closer to the second axis of rotation, the inertia associated with the pitch joint stroke of the second module is reduced, and the dynamic performance and movement of the apparatus, and any industrial robot arm including the apparatus, is improved in an efficient way. Further, as a result of the inventive displacement of the motor unit, the extension of the roll joint type third module in the direction of its axis of rotation can be reduced, which also provides a flexibility in the design of the industrial robot arm. Further, when the terminal wrist unit of an industrial robot arm includes the third module of said apparatus, the extension of the third module in the direction of its axis of rotation can be reduced such that the wrist offset is efficiently minimized, providing a radically reduced inertia and consequently radically improved dynamic performance of the wrist unit, and providing a compact and non-bulky wrist unit with improved mobility and flexibility.

Because of the inventive displacement of the motor unit, the above-mentioned improvements are attained in spite of the feature that the output shaft of the motor unit is rotatable about an axis which is substantially collinear with the third axis of rotation, which provides a structure which is not complex and is uncomplicated to manufacture, and there is no need for any complex additional equipment, such as additional gears or pinions, which appears in some of the prior art documents listed above, for transmitting rotation from the motor unit to the rotating member of the third module, to achieve the above-mentioned improvements or positive effects.

A member of a module can be rigidly attached, secured, or affixed, to the member of another module by being integrally formed with it, or by being secured to it by welding, or by any other suitable means.

According to an advantageous embodiment of the apparatus according to the present invention, the modules are positionable such that the first axis of rotation is substantially collinear with the third axis of rotation, and the second axis of rotation is offset from the first and the third axis of rotation when the first axis of rotation is substantially collinear with the third axis of rotation. The inventive displacement of the motor unit is further advantageous to embodiments where the modules are connected to each other such that the second axis of rotation is offset from the first and the third axis of rotation when the first axis of rotation is substantially collinear with the third axis of rotation.

According to another advantageous embodiment of the apparatus according to the present invention, where the second axis of rotation is offset from the first and the third axis of rotation when the first axis of rotation is substantially collinear with the third axis of rotation, the motor unit intersects a plane in which the second axis of rotation lies, which plane is substantially perpendicular to the first axis of rotation when the first axis of rotation is substantially collinear with the third axis of rotation.

According to a further advantageous embodiment of the apparatus according to the present invention, the motor unit is adapted to drive the relative rotation of the first and second members of the third module via a transmission adapted to transmit rotation to the second member of the third module, and the axis of rotation of said transmission is substantially collinear with the third axis of rotation.

According to another advantageous embodiment of the apparatus according to the present invention, the transmission comprises a harmonic drive assembly. However, other kinds of transmission are also possible.

According to still another advantageous embodiment of the apparatus according to the present invention, where the second axis of rotation is offset from the first and the third axis of rotation when the first axis of rotation is substantially collinear with the third axis of rotation, at least one tenth of the extension of the motor unit in the direction of the third axis of rotation is situated between said plane and the first module, when the third axis of rotation is substantially collinear with the first axis of rotation. The inventor has found that embodiments, where at least one tenth of the extension of the motor unit in the direction of the third axis of rotation is situated between said plane and the first module, further improves the movement and the dynamic performance of a robot arm.

According to yet another advantageous embodiment of the apparatus according to the present invention, where the second axis of rotation is offset from the first and the third axis of rotation when the first axis of rotation is substantially collinear with the third axis of rotation, the entire motor unit is positionable between the first module and a plane in which the second axis of rotation lies, and which plane is substantially perpendicular to the first axis of rotation. Hereby, the movement of a robot arm can be further improved, as the third module can rotate to a greater extent about the second axis of rotation. By this, the third module can be folded back to a great extent in an additional direction, and thus provide a greater backward stroke of the pitch joint type second module, with minimal compromise with regard to the compactness of the second module.

According to an advantageous embodiment of the apparatus according to the present invention, where the second axis of rotation is offset from the first and the third axis of rotation when the first axis of rotation is substantially collinear with the third axis of rotation, the extension of the first member of the second module in the direction of the third axis of rotation is greater in relation to the extension of the second member of the second module in the direction of the third axis of rotation, when the third axis of rotation is substantially collinear with the first axis of rotation. Hereby, the movement of a robot arm can be further improved in an efficient way. This difference in extension of the first and second members of the pitch joint type second module enables an efficient displacement of the second axis of rotation in the direction towards the third module and further away from the first module, establishing a space between the second axis or rotation and the first module for rotation of the motor unit around the second axis of rotation, providing for that the motor unit to be positionable in an efficient way between the first module and the plane in which the second axis of rotation lies, and which plane is substantially perpendicular to the first axis of rotation.

According to a further advantageous embodiment of the apparatus according to the present invention, the second module comprises a motor unit adapted to drive the relative rotation of the first and second members of the second module and comprising an output shaft rotatable about an axis which is substantially collinear with the second axis of rotation, and in that one of the first and second members of the second module is positioned between the motor unit and the other member of the second module. Hereby, the load on the pitch joint type second module is reduced, since the first and second members of the second module are connected without any intermediate member of substantial extension in the direction of the second axis of rotation.

According to still another advantageous embodiment of the apparatus according to the present invention, the motor unit is in the form of an electric motor. Hereby, the movement and the dynamic performance of a robot arm is further improved.

According to an advantageous embodiment of the apparatus according to the present invention, the second member of the third module is provided with mounting means for holding at least one tool, for example a gripping tool. By this feature, the third module forms part of a wrist unit which terminates a robot arm. By incorporating the inventive displacement of the motor unit into the wrist unit, the extension of the roll joint type third module in the direction of its axis of rotation can be reduced such that the wrist offset is efficiently minimized, providing a radically reduced inertia and consequently radically improved dynamic performance of the wrist unit, and providing a compact and non-bulky wrist unit with improved mobility and flexibility.

The above-mentioned object of the present invention is also attained by providing an industrial robot arm comprising at least one apparatus having the features which are described herein. The apparatus can include any of the pitch joints of an industrial robot arm, and can thus be incorporated anywhere between the base and the terminal wrist unit of the industrial robot. The robot arm, or manipulator, can have six or seven degrees of freedom, DOF, or any other suitable number of DOF.

According to an advantageous embodiment of the industrial robot arm according to the present invention, the industrial robot arm comprises a plurality of apparatuses each as described herein. When including a plurality of apparatuses, the above-mentioned positive effects associated with a single apparatus are manifold with regard to the performance of the industrial robot arm. When two apparatuses are adjacent to each other, the first module of one of the apparatuses can be the third module of the other apparatus, and apparatuses can thus share the same module.

According to a further advantageous embodiment of the industrial robot arm according to the present invention, the industrial robot arm comprises a terminal wrist unit, and the wrist unit includes the third module of said apparatus. The positive effects of incorporating the third module into the wrist unit of an industrial robot arm have been described above.

Further, the above-mentioned object of the present invention is attained by providing an industrial robot having an industrial robot arm which comprises the features described herein.

Further advantageous embodiments and further advantages of the apparatus, the industrial robot arm and the industrial robot according to the present invention emerge from the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF PREFERRED EMBODIMENTS

Figure 1:
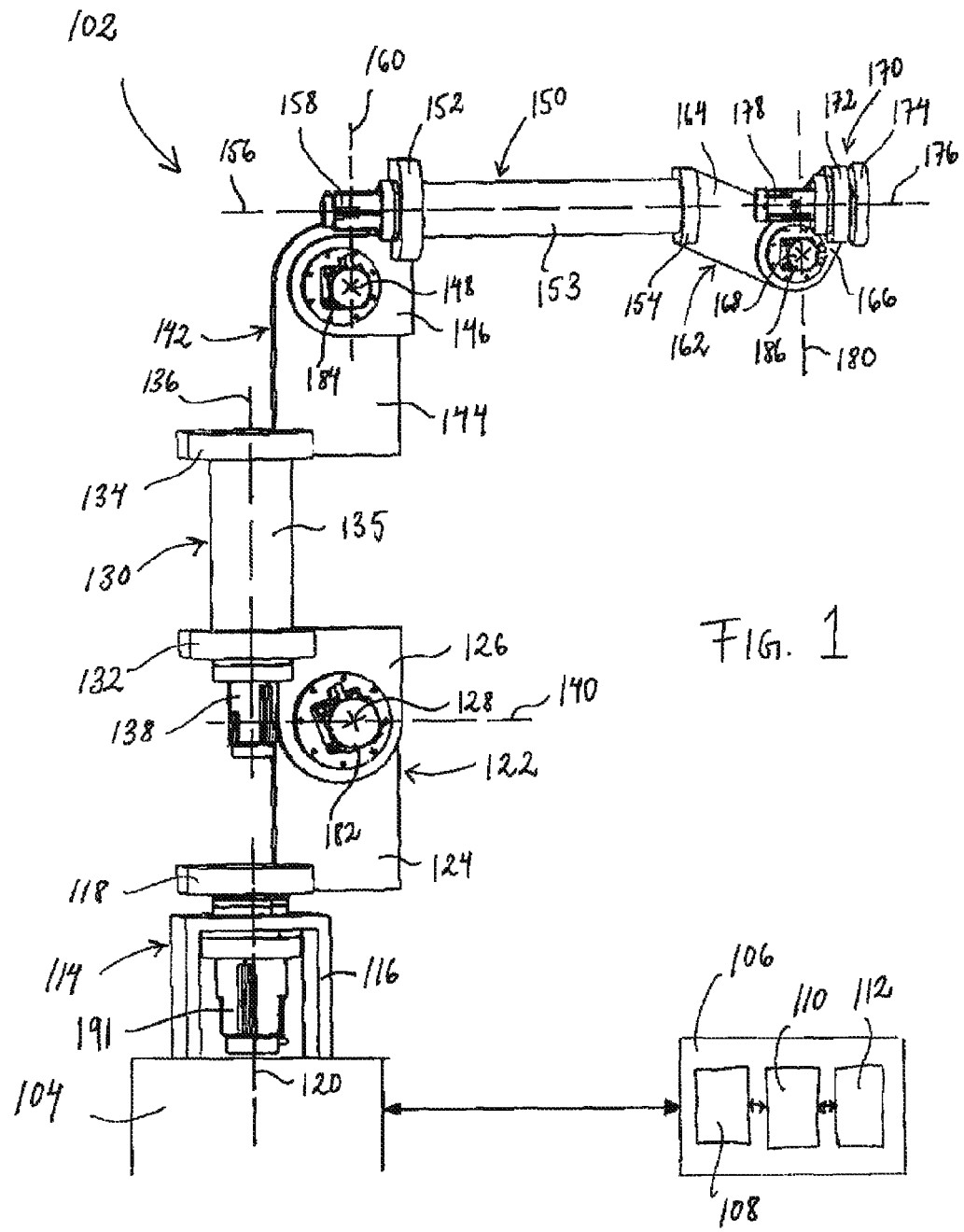
FIG. 1 is a schematic side view of an embodiment of the industrial robot according to the present invention provided with an embodiment of the industrial robot arm according to the present invention, where the industrial robot arm includes three embodiments of the apparatus according to the present invention.

FIG. 1 schematically shows an industrial robot including an industrial robot arm 102, or a manipulator 102, a base 104 to which the robot arm 102 is connected, and a control system 106 for controlling the robot arm 102. The control system is designed in a conventional way known to the skilled person, and may include a digital computer 108, a data memory 110 and an input unit 112 for input of control parameters, for example in the form of control schemes.

The robot arm 102 is built up of two basic types of modules, roll joint type modules and pitch joint type modules. The robot arm 102 comprises:

- a roll joint type first module 114 comprising a first member 116 and a second member 118 rotatable in relation to each other about a first axis of rotation 120, the first member 116 being rigidly secured to the base 104 of the industrial robot;
- a pitch joint type second module 122 comprising a first member 124 and a second member 126 rotatable in relation to each other about a second axis of rotation 128, the first member 124 of the second module 122 being rigidly attached to the second member 118 of the first module 114; and
- a roll joint type third module 130 comprising a first member 132 and a second member 134 rotatable in relation to each other about a third axis of rotation 136, the first member 132 of the third module 130 being rigidly attached to the second member 126 of the second module 122;
- where the second axis of rotation 128 is substantially perpendicular to the first and the third axis of rotation 120, 136, the second axis of rotation 128 is offset from the first and the third axis of rotation 120, 136 when the first axis of rotation 120 is substantially collinear with the third axis of rotation 136, and the third module 130 comprises a motor unit 138 comprising an output shaft rotatable about an axis which is substantially collinear with the third axis of rotation 138, the motor unit 138 being adapted to drive the relative rotation of the first and second members 132, 134 of the third module 130. Further, the motor unit 138 of the third module 130 intersects a plane 140 in which the second axis of rotation 128 lies, and which plane 140 is substantially perpendicular to the third axis of rotation 136 and, when the first axis of rotation 120 is substantially collinear with the third axis of rotation 136, is substantially perpendicular to the first axis of rotation 120.

The robot arm 102 further comprises:

- a pitch joint type fourth module 142 comprising a first member 144 and a second member 146 rotatable in relation to each other about a fourth axis of rotation 148, the first member 144 of the fourth module 142 being rigidly attached, secured, or affixed, to the second member 134 of the third module 130; and
- a roll joint type fifth module 150 comprising a first member 152 and a second member 154 rotatable in relation to each other about a fifth axis of rotation 156, the first member 152 of the fifth module 150 being rigidly attached to the second member 146 of the fourth module 142;
- where the fourth axis of rotation 148 is substantially perpendicular to the third and the fifth axis of rotation 136, 156, the fourth axis of rotation 148 is offset from the third and the fifth axis of rotation 136, 156 when the third axis of rotation 136 is substantially collinear with the fifth axis of rotation 156, and the fifth module 150 comprises a motor unit 158 comprising an output shaft rotatable about an axis which is substantially collinear with the fifth axis of rotation 156, the motor unit 158 being adapted to drive the relative rotation of the first and second members 152, 154 of the fifth module 150. Further, the motor unit 158 of the fifth module 150 intersects a plane 160 in which the fourth axis of rotation 148 lies, and which plane 160 is substantially perpendicular to the fifth axis of rotation 156 and, when the third axis of rotation 136 is substantially collinear with the fifth axis of rotation 156, is substantially perpendicular to the third axis of rotation 136.

The robot arm 102 further comprises:

a pitch joint type sixth module 162 comprising a first member 164 and a second member 166 rotatable in relation to each other about a sixth axis of rotation 168, the first member 164 of the sixth module 162 being rigidly attached to the second member 154 of the fifth module 150; and a roll joint type seventh module 170 comprising a first member 172 and a second member 174 rotatable in relation to each other about a seventh axis of rotation 176, the first member 172 of the seventh module 170 being rigidly attached to the second member 166 of the sixth module 162;

where the sixth axis of rotation 168 is substantially perpendicular to the fifth and the seventh axis of rotation 156, 176, the sixth axis of rotation 168 is offset from the fifth and the seventh axis of rotation 156, 176 when the fifth axis of rotation 156 is substantially collinear with the seventh axis of rotation 176, and the seventh module 170 comprises a motor unit 178 comprising an output shaft rotatable about an axis which is substantially collinear with the seventh axis of rotation 176, the motor unit 178 being adapted to drive the relative rotation of the first and second members 172, 174 of the seventh module 170. Further, the motor unit 178 of the seventh module 150 intersects a plane 180 in which the sixth axis of rotation 168 lies, and which plane 180 is substantially perpendicular to the seventh axis of rotation 176 and, when the fifth axis of rotation 156 is substantially collinear with the seventh axis of rotation 176, is substantially perpendicular to the fifth axis of rotation 156.

The first member 124, 132, 144, 152, 164, 172 of each module 122, 130, 142, 150, 162, 170, except the first module 114, is considered to be indirectly connected to the base 104 of the industrial robot via at least one previous intermediate module 114, 122, 130, 142, 150, 162, and the second member 118, 126, 134, 146, 154, 166 of each module 114, 122, 130, 142, 150, 162, except the seventh module 170, is considered to be indirectly connected to the wrist unit of the industrial robot via at least one intermediate subsequent module 122, 130, 142, 150, 162, 170.

The robot arm 102 includes three exemplary apparatuses according to the present invention, where the first apparatus includes the first, the second and the third module 114, 122, 130, the second apparatus includes the third, the fourth and the fifth module 130, 142, 150, and the third apparatus includes the fifth, the sixth and the seventh module 150, 162, 170.

The second member 134 of the third module 130, and the second member 154 of the fifth module 150 each includes a cylindrical elongated member 135, 155, the length of which can be altered to fulfil any specific requirement.

As shown in FIG. 1, within each of said apparatuses, at least one tenth of the extension of the motor unit 138, 158, 178 in the direction of the axis of rotation 136, 156, 176 of the motor unit's 138, 158, 178 roll joint type module 130, 150, 170 is situated between said plane of the apparatus and the adjacent roll joint type module 114, 130, 150 of the same apparatus, when the axis of rotation of the motor unit's roll joint type module 130, 150, 170 is substantially collinear with the axis of rotation of the adjacent roll joint type module 114, 130, 150 of the same apparatus.

When the entire robot arm 102 is stretch out in vertical direction with regard to FIG. 1, such that the first, the third, the fifth and the seventh axis of rotation 120, 136, 156, 176 are substantially collinear with each other forming a common longitudinal axis, then for each of the second, the fourth and the sixth module, the extension of the first member 124, 144, 164 in the direction of said longitudinal axis is greater in relation to the extension of the second member 126, 146, 166 in the direction of said longitudinal axis. By this structure, within each of said apparatuses, the entire motor unit 138, 158, 178 of the roll joint type module 130, 150, 170 is positionable between the adjacent roll joint type module 114, 130, 150 of the same apparatus and a plane in which the axis of rotation 128, 148, 168 of the pitch joint type module 122, 142, 162 of the same apparatus lies, and which plane is substantially perpendicular to the axis of rotation of the adjacent roll joint type module 114, 130, 150 of the same apparatus.

Further, each pitch joint type module 122, 142, 162 comprises a motor unit 182, 184, 186 adapted to drive the relative rotation of the first and second members 124, 126, 144, 146, 164, 166 of the respective pitch joint type module 122, 142, 162 and comprising an output shaft rotatable about an axis which is substantially collinear with the axis of rotation 128, 148, 168 of the respective pitch joint type module 122, 142, 162.

Figure 2:
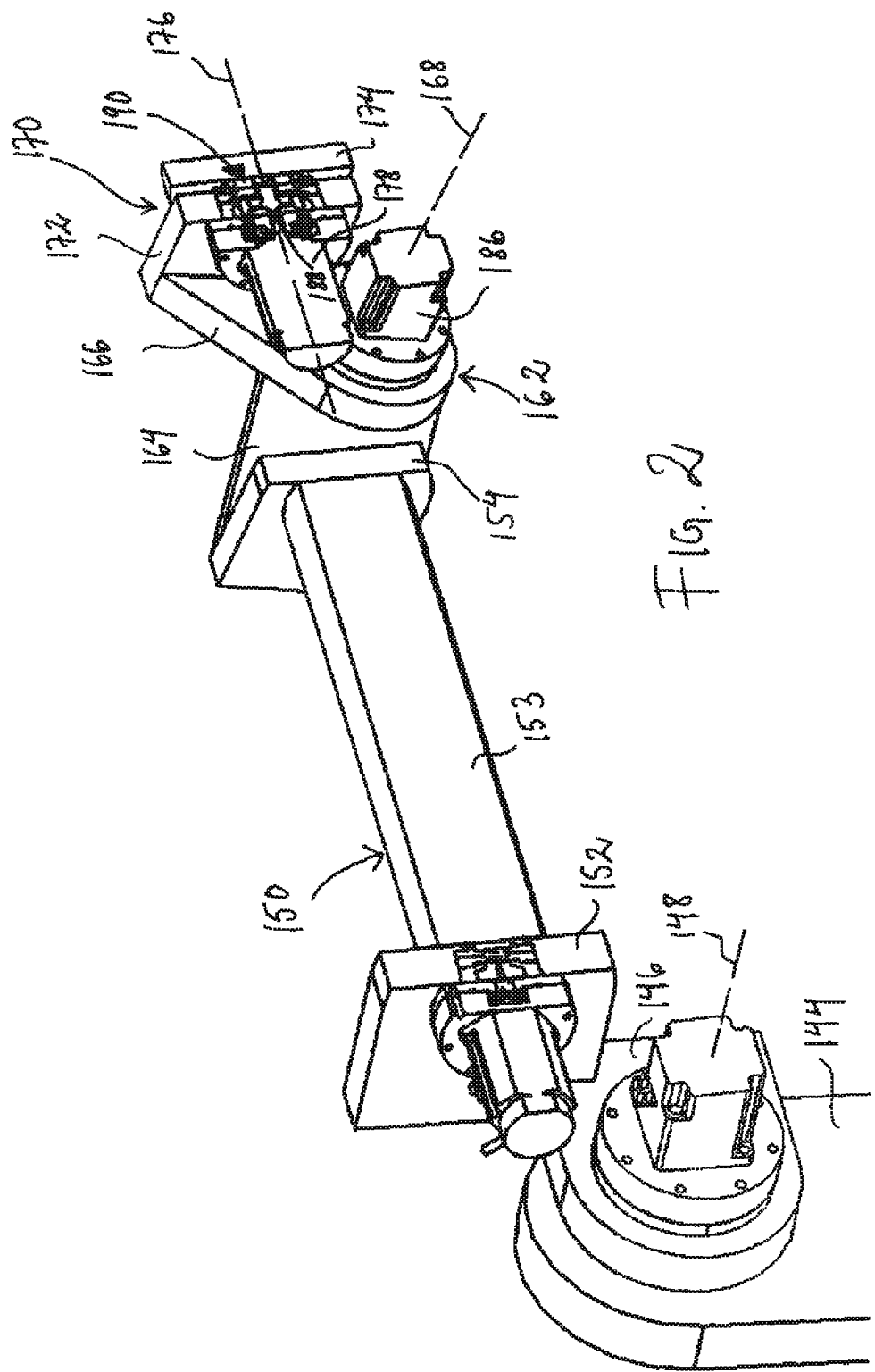
FIG. 2 is an enlarged partly cutaway view of a portion of the industrial robot arm of FIG. 1.

With reference to FIG. 2, the seventh module 170, the sixth module 162 and the fifth module 150 are disclosed in more detail, however, the corresponding modules within the other of said apparatuses are considered to have a corresponding structure.

As mentioned above, the motor unit 178 of the seventh module 170 comprises an output shaft 188 rotatable about an axis which is substantially collinear with the seventh axis of rotation 176, and the motor unit 178 is adapted to drive the relative rotation of the first and second members 172, 174 of the seventh module 170. The motor unit 178 is adapted to drive the relative rotation of the first and second members 172, 174 of the seventh module 170 via a harmonic drive assembly 190 adapted to transmit rotation to the second member 174 of the seventh module 170, and the axis of rotation of said harmonic drive assembly 190 is substantially collinear with the seventh axis of rotation 176. The harmonic drive assembly 190 per se can be designed in any suitable conventional way known to the person skilled in the art.

Within each of said apparatuses, one 126, 146, 166 of the first and second members 124, 126, 144, 146, 164, 166 of each pitch joint type module 122, 142, 162 is positioned between the motor unit 182, 184, 186 of pitch joint type module 122, 142, 162 and the other member 124, 144, 164 of the pitch joint type module 122, 142, 162. Hereby, the load on the pitch joint type module 122, 142, 162 is reduced, since the first and second members of the pitch joint type module 122, 142, 162 are connected without any intermediate member of substantial extension in the direction of the axis of rotation of the respective pitch joint type module 122, 142, 162. The structure of the motor units 182, 184, 186 of each pitch joint type module 122, 142, 162 corresponds in principal to the structure of the motor units 138, 158, 178 of the roll joint type modules 130, 150, 170 and are also each equipped with a harmonic drive assembly.

Figure 3:
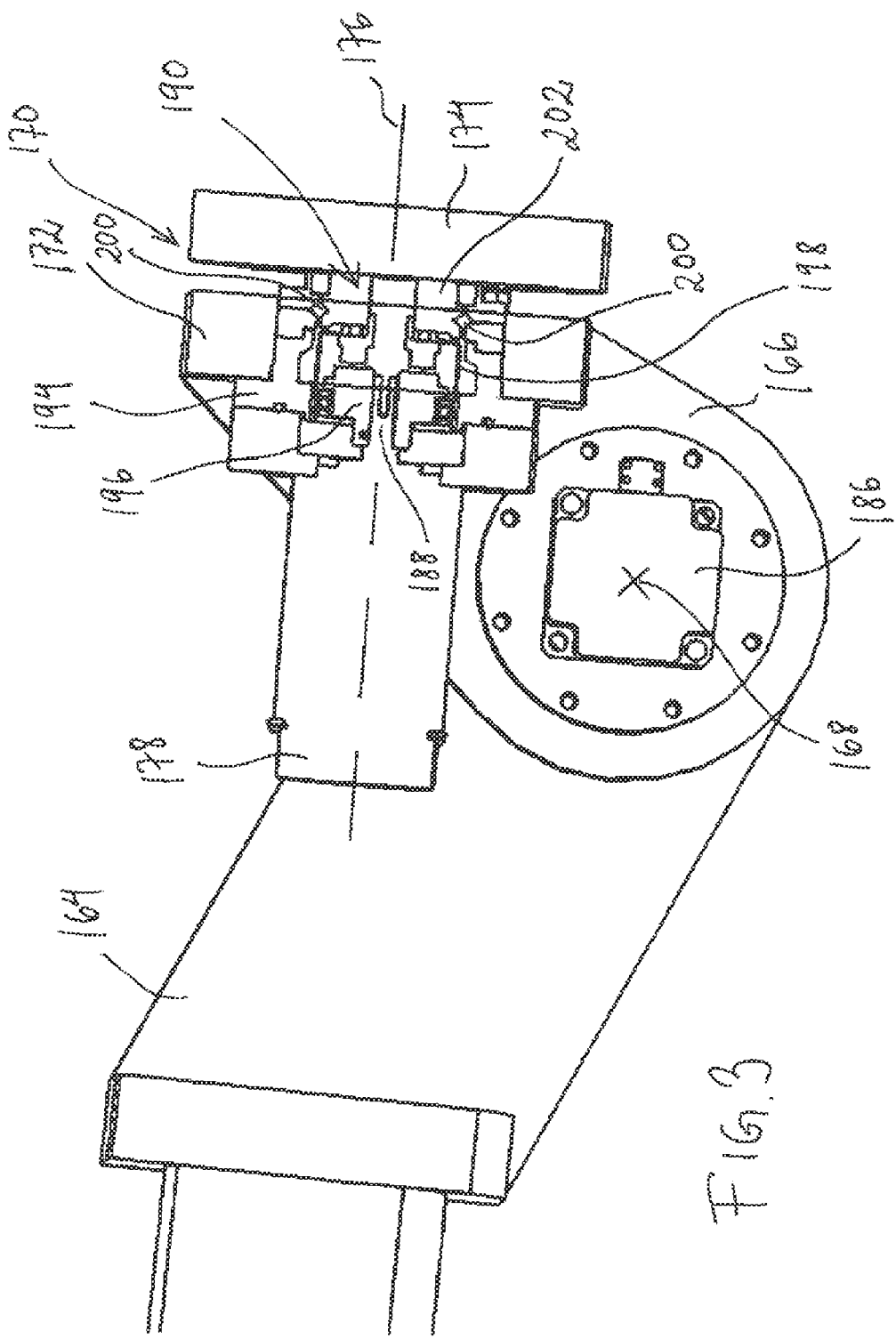
FIG. 3 is a further enlarged cutaway view of a portion of the industrial robot arm of FIG. 1.

In FIG. 3, the seventh module 170 and the harmonic drive assembly 190 are shown in more detail. The schematically shown harmonic drive assembly 190 is designed in a conventional way known to the skilled person and includes a housing 194 which is rigidly affixed the first member 172 of the roll joint type seventh module 170. The housing 194 houses a wave generator 196, a flex spline 198, a cross roller bearing 200, in which the second member 174 of the seventh module 170 is journalled, and a transmission output 202. The housing 194 extends through an opening in the first member 172 of the roll joint type seventh module 170. Each of the above-mentioned exemplary modules is provided with a motor unit combined with a harmonic drive assembly as disclosed in connection with the seventh module 170 in FIG. 3.

With reference to FIG. 1, the first module 114 also includes a motor unit 191 adapted to drive the relative rotation of the first and second members 116, 118 of the first module 114.

Each of the above disclosed motor units of the embodiments is in the form of an electric motor functioning in a manner known to the skilled person.

Figure 4:
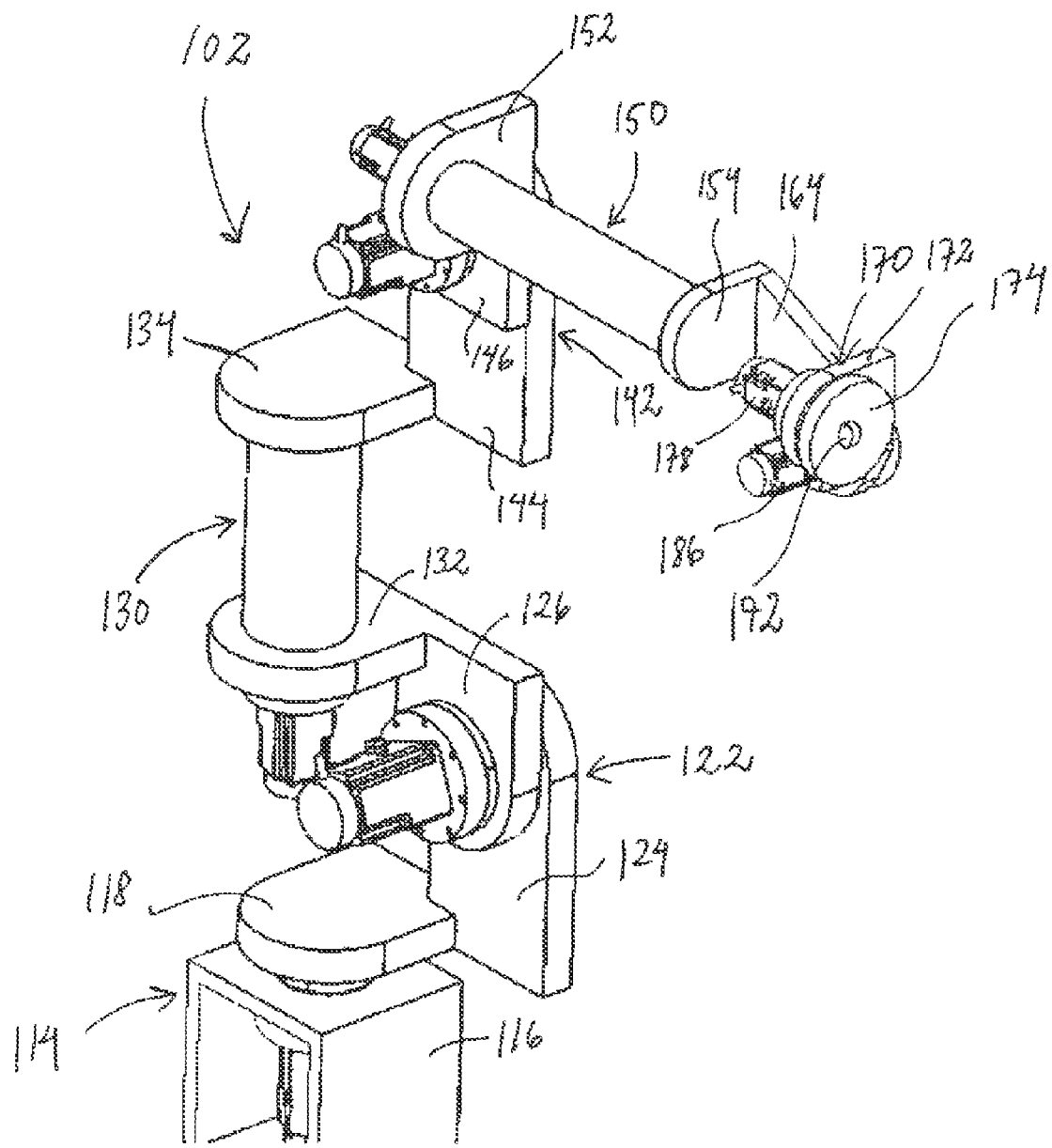
FIG. 4 is a schematic perspective view of the industrial robot arm of FIG. 1

FIG. 4 is a schematic perspective view of the industrial robot arm of FIG. 1. The second member 174 of the seventh module 170 is provided with mounting means 192, or a mounting unit, or mounting element, for holding at least one tool, for example a gripping tool. Here, the mounting means 192 is in the form of a threaded recess, but the second member 174 can be provided with any suitable mounting means known in prior art. The industrial robot arm 102 comprises a terminal wrist unit which includes the seventh module 170. The tool to be held by the mounting means 192 is powered and controlled by the control system 106 and powered and controlled via suitable conventional means, such as cables, known to the skilled person.

The motor units are powered and controlled by the control system via suitable conventional means known to the skilled person, such as cables suitably arranged along the extension of the robot arm, and it is to be understood that the robot arm and its apparatuses can be equipped with sensors and additional equipment known to the person skilled in the art, in order to effect a suitable performance of the industrial robot arm, or manipulator, for example as described in EP-A2-0 233 712.

The invention shall not be considered limited to the embodiments illustrated, but can be modified and altered in many ways by one skilled in the art, without departing from the scope of the appended claims. For example, the different modules can be designed in various ways, and can be provided with various kinds of protective skins or housings, and additional equipment. Additional modules can also be connected to the industrial robot arm providing the arm with further DOF.

The invention claimed is:

1. An apparatus for a robot arm of an industrial robot, the apparatus comprising:
   a first module comprising a first and a second member rotatable in relation to each other about a first axis of rotation, the first member being indirectly, or directly, connectable to a base of the industrial robot,
   a second module comprising a first and a second member rotatable in relation to each other about a second axis of rotation, the first member of the second module being rigidly attached to the second member of the first module, and
   a third module comprising a first and a second member rotatable in relation to each other about a third axis of rotation, the first member of the third module being rigidly attached to the second member of the second module,
   wherein the second axis of rotation is substantially perpendicular to the first and the third axis of rotation, the second axis of rotation is offset from the first and the third axis of rotation when the first axis of rotation is substantially parallel to the third axis of rotation, and the third module comprises a motor unit comprising an output shaft rotatable about an axis which is substantially collinear with the third axis of rotation, the motor unit drives the relative rotation of the first and second members of the third module, wherein the motor unit intersects a plane in which the second axis of rotation lies, the plane is substantially perpendicular to the third axis of rotation.

2. The apparatus according to claim 1, wherein the modules are positionable such that the first axis of rotation is substantially collinear with the third axis of rotation, and wherein the second axis of rotation is offset from the first and the third axis of rotation when the first axis of rotation is substantially collinear with the third axis of rotation.

3. The apparatus according to claim 2, wherein the motor unit intersects the plane in which the second axis of rotation lies, the plane is substantially perpendicular to the first axis of rotation when the first axis of rotation is substantially collinear with the third axis of rotation.

4. The apparatus according to claim 2, wherein the at least one tenth of the extension of the motor unit in the direction of the third axis of rotation is situated between said plane and the first module, when the third axis of rotation is substantially collinear with the first axis of rotation.

5. The apparatus according to claim 1, wherein the entire motor unit is positionable between the first module and the plane in which the second axis of rotation lies, and the plane is substantially perpendicular to the first axis of rotation.

6. The apparatus according to claim 2, wherein the extension of the first member of the second module in the direction of the third axis of rotation is greater in relation to the extension of the second member of the second module in the direction of the third axis of rotation, when the third axis of rotation is substantially collinear with the first axis of rotation.

7. The apparatus according to claim 1, wherein the motor unit drives the relative rotation of the first and second members of the third module via a transmission that transmits rotation to the second member of the third module, and wherein the axis of rotation of said transmission is substantially collinear with the third axis of rotation.

8. The apparatus according to claim 7, wherein the transmission comprises a harmonic drive assembly.

9. The apparatus according to claim 1, wherein the second module comprises a motor unit that drives the relative rotation of the first and second members of the second module and comprising an output shaft rotatable about an axis which is substantially collinear with the second axis of rotation, and wherein one of the first and second members of the second module is positioned between the motor unit and the other member of the second module.

10. The apparatus according to claim 1, wherein the motor unit is in the form of an electric motor.

11. The apparatus according to claim 1, wherein the second member of the third module is provided with a mounting module that holds at least one tool.

12. An industrial robot arm, comprising:
   at least one apparatus comprising
   a first module comprising a first and a second member rotatable in relation to each other about a first axis of rotation, the first member being indirectly, or directly, connectable to a base of the industrial robot,
   a second module comprising a first and a second member rotatable in relation to each other about a second axis of rotation, the first member of the second module being rigidly attached to the second member of the first module, and a third module comprising a first and a second member rotatable in relation to each other about a third axis of rotation, the first member of the third module being rigidly attached to the second member of the second module, wherein the second axis of rotation is substantially perpendicular to the first and the third axis of rotation, the second axis of rotation is offset from the first and the third axis of rotation when the first axis of rotation is substantially parallel to the third axis of rotation, and the third module comprises a motor unit comprising an output shaft rotatable about an axis which is substantially collinear with the third axis of rotation, the motor unit that drives the relative rotation of the first and second members of the third module, wherein the motor unit intersects a plane in which the second axis of rotation lies, the plane is substantially perpendicular to the third axis of rotation.

13. The industrial robot arm according to claim 12, wherein the industrial robot arm comprises a plurality of the apparatuses.

14. The industrial robot arm according to claim 12, wherein the industrial robot arm comprises a terminal wrist unit, and wherein the wrist unit includes the third module of said apparatus.

15. An industrial robot, comprising:
an industrial robot arm comprising at least one apparatus comprising a first module comprising a first and a second member rotatable in relation to each other about a first axis of rotation, the first member being indirectly, or directly, connectable to a base of the industrial robot, a second module comprising a first and a second member rotatable in relation to each other about a second axis of rotation, the first member of the second module being rigidly attached to the second member of the first module, and a third module comprising a first and a second member rotatable in relation to each other about a third axis of rotation, the first member of the third module being rigidly attached to the second member of the second module, wherein the second axis of rotation is substantially perpendicular to the first and the third axis of rotation, the second axis of rotation is offset from the first and the third axis of rotation when the first axis of rotation is substantially parallel to the third axis of rotation, and the third module comprises a motor unit comprising an output shaft rotatable about an axis which is substantially collinear with the third axis of rotation, the motor unit drives the relative rotation of the first and second members of the third module, wherein the motor unit intersects a plane in which the second axis of rotation lies, the plane is substantially perpendicular to the third axis of rotation.

16. The apparatus according to claim 11, wherein the at least one tool comprises a gripping tool.

* * * * *

UNITED STATES PATENT AND TRADEMARK OFFICE
CERTIFICATE OF CORRECTION

| | |
|---|---|
| PATENT NO. | : 8,677,854 B2 |
| APPLICATION NO. | : 13/259509 |
| DATED | : March 25, 2014 |
| INVENTOR(S) | : Ivan Lundberg |

Page 1 of 1

It is certified that error appears in the above-identified patent and that said Letters Patent is hereby corrected as shown below:

Title Page, should read

(73) Assignee

ABB Research Ltd., Zürich (CH)

Signed and Sealed this
First Day of July, 2014

Michelle K. Lee
*Deputy Director of the United States Patent and Trademark Office*